(12) United States Patent
Albuquerque De Souza E Silva

(10) Patent No.: US 6,708,789 B1
(45) Date of Patent: Mar. 23, 2004

(54) SYSTEM FOR A HYBRID VEHICLE; HYBRID VEHICLE OPERATED BY THE SYSTEM AND DEVICE FOR POWER

(75) Inventor: Antonio Vincente Albuquerque De Souza E Silva, Rio de Janeiro (BR)

(73) Assignee: Eletra Industrial Ltda., Sao Bernardo do Campo (BR)

( * ) Notice: Subject to any disclaimer, the term of this patent is extended or adjusted under 35 U.S.C. 154(b) by 0 days.

(21) Appl. No.: 09/857,458
(22) PCT Filed: Oct. 4, 2000
(86) PCT No.: PCT/BR00/00108

§ 371 (c)(1),
(2), (4) Date: Oct. 12, 2001

(87) PCT Pub. No.: WO01/25041
PCT Pub. Date: Apr. 12, 2001

(30) Foreign Application Priority Data

Oct. 5, 1999 (BR) .............................................. 9904360

(51) Int. Cl.[7] .................................................. B60K 6/00
(52) U.S. Cl. ...................................... 180/65.2; 180/65.3
(58) Field of Search ............................... 180/65.2, 65.3, 180/65.4, 65.5, 301

(56) References Cited

U.S. PATENT DOCUMENTS

| | | | | |
|---|---|---|---|---|
| 3,719,881 A | * | 3/1973 | Shibata et al. ............. | 180/65.4 |
| 3,923,115 A | * | 12/1975 | Helling ........................ | 180/165 |
| 4,021,677 A | * | 5/1977 | Rosen et al. ................ | 180/65.2 |
| 4,533,011 A | * | 8/1985 | Heidemeyer et al. ...... | 180/65.2 |
| 4,597,463 A | * | 7/1986 | Barnard ....................... | 180/165 |
| 5,428,274 A | * | 6/1995 | Furutani et al. ............. | 318/106 |
| 5,492,189 A | * | 2/1996 | Kriegler et al. ............. | 180/65.2 |
| 5,513,719 A | * | 5/1996 | Moroto et al. .............. | 180/65.4 |
| 5,806,617 A | * | 9/1998 | Yamaguchi ................. | 180/65.2 |
| 5,927,417 A | * | 7/1999 | Brunner et al. ............. | 180/374 |
| 6,044,922 A | * | 4/2000 | Field ........................... | 180/65.2 |
| 2002/0098414 A1 | * | 7/2002 | Ovshinsky et al. ......... | 429/223 |

* cited by examiner

*Primary Examiner*—Brian L. Johnson
*Assistant Examiner*—Kelly E Campbell
(74) *Attorney, Agent, or Firm*—Jacobson Holman PLLC

(57) ABSTRACT

A hybrid vehicle control and operating system, a hybrid vehicle operated by the system, and a power supply arrangement for the hybrid vehicle where the drive of the hybrid vehicle is performed only by an electric motor driven by a generator under average power conditions and, under maximum power conditions, is driven by the generator and also by a battery bank that provides complementary energy to the electric motor. The bank of batteries accumulates energy exceeded by the generator and/or electric motor when the vehicle is under deceleration conditions or even stopped. The generator is driven by an internal combustion engine that supplies mechanical energy to the generator so that it can supply electric power to the electric motor and to the battery bank.

9 Claims, 1 Drawing Sheet

SYSTEM FOR A HYBRID VEHICLE; HYBRID VEHICLE OPERATED BY THE SYSTEM AND DEVICE FOR POWER

This application is the national phase under 35 U.S.C. §371 of PCT International Application No. PCT/BR00/00108 which has an International filing date of Oct. 4, 2000, which designated the United States of America and was published in English.

SUMMARY OF THE INVENTION

The present invention refers to an operating system for a hybrid vehicle, as well as to the hybrid system that is operated by the mentioned system. The present invention also deals with the device that integrates the mentioned system and that has as function to provide power supply and accumulation. More specifically, it refers to a hybrid system and a hybrid vehicle driven solely by an electric motor driven by means of a generator driven by an internal combustion engine.

The "Hybrid Vehicle" terminology is usually applied to vehicles using more than one power source for its displacement. Preferably, this name is being used for vehicles that use an internal combustion engine associated with equipment for the generation of electric power "on board". The electric power, which, in turn, is used to drive a traction electric motor that can operate independently and/or associated to the internal combustion engine to drive the vehicle wheels. There is a very wide variety of set up and vehicle types that can be classified as "hybrid".

The hybrid traction or driving systems are known as possessing a double power source. A specified type of hybrid system is the one using the electric power from an electric motor and equipped with an internal combustion engine, both of which are used to drive the vehicle. The vehicles inherent to such systems are known as hybrid vehicles using dual traction. Such is the system described in the U.S. Pat. No. 5,513,719 published on May 7, 1996, that shows an internal combustion engine and an electric motor acting alternatively as vehicle traction source. The dual system to be applied needs a special driving or transmission system, which is the object of U.S. Pat. No. 5,513,719.

These systems would be proper for the use in smaller vehicles such as passenger cars for urban use in which the power requirement of the combustion engine would be considerably smaller.

In the case of use of this dual system for bigger vehicles, such as collective vehicles using, for instance, diesel fuel, the combustion engine would necessarily have considerably higher power, which would also give rise to much bigger dimensions.

In the same way, as electric motor in this system, evidently when used in a bigger vehicle, would require to be supplied solely and exclusively by the power supply element, such as battery which would logically require more charge and have a larger dimension in order to feed a larger size vehicle, fed by the electric system alone, when selected by the control system.

So, such a solution is not proper to be used in larger size vehicles, such as a collective vehicle.

Therefore, the first objective of the present invention is to provide a system to be used with any kind of vehicle, including collective vehicles with diesel fuel, that dispense with the need for specific transmissions and uses solely the electric motor as the driving engine. Thus, the adoption of the proposed system, would give rise, as first consequence, the elimination of the vehicle gearbox. Obviously, the vehicles using the hybrid system of this invention present these and other significant advantages as compared with vehicles moved by a conventional internal combustion or the vehicles using solely battery.

Another object of the present invention is to provide a hybrid vehicle equipped with the hybrid system of the present invention, which is provided with an internal combustion engine that operates at a constant rotation and close to the rotation of the engine maximum torque, i.e., it can be set to work close to the optimum point of less fuel consumption and pollutant emission, that provides a significant reduction in the emission of gases to the atmosphere, that has been proven in practical measurements that indicate a significant reduction of the pollutants emission, achieving a decrease of up to 60%.

It is an additional objective of the present application, to provide device for power supply and accumulation which operates alternately feeding power to the electric motor or accumulating power into a battery bank thus working as a true energy lung.

In hybrid vehicles with dual traction or driving or in electric vehicles of the state of the art, when operated with electric motor as the driving engine, this power required to move them come from power accumulators, also called battery banks. Usually, these battery banks have the capacity to move the vehicle for a certain time, depending on the vehicle use conditions—speed, transported load, etc., until the electric charge is reduced and it is necessary to replace this battery bank or stop the vehicle during the time required to recharge the battery bank from an external source.

The proposed system presents several advantages related to the usual hybrid systems in the state of the art, which will be described later in this document. Similarly, the advantages obtained by the vehicle incorporating the proposed hybrid system, as well as the adoption of the Battery Bank, acting as a true energy lung, will be emphasized herein.

To give an example, but not to limit the scope, the description of the system and vehicle proposed, is based on their use in collective vehicles, such as a bus, moved by diesel as fuel. With the system proposed in the present invention, the diesel engine works always in a constant rotation and driving a power generator that supply the traction electric motor with electric power and the surplus of this electric power goes to charge the battery bank. Therefore, the diesel engine can be set to work at its optimum point for a less combustible consumption and a reduced pollutant emission. Practical measurements indicate that pollutant emissions are reduced in a significant way, and one can get up to 60% decrease. The fuel consumption is also very reduced, as the engine is not submitted to the successive acceleration and deceleration that characterize the operation in a traditional internal combustion vehicle.

The use of a battery bank, only as an "energetic lung" allows that this battery bank is small, with capacity much lower than one that would be necessary to operate a vehicle moved only by batteries. As a magnitude order, the capacity (and the weight) of the battery bank necessary for the operation of the hybrid vehicle described herein is about one tenth (1/10) of the one that would be necessary to operate the same vehicle if it was moved only by batteries. In addition, the hybrid vehicle autonomy is almost unlimited (it depends only on the combustible tank), on the contrary of a battery vehicle, that presents a very restricted autonomy, due to the need for recharging or replacing the battery bank within times somewhat short (hours of operation). In addition, due to the fact that, in the hybrid vehicle, batteries never have deep discharge, its lifetime increases very much, as compared to the service life that they present in vehicles solely moved with battery, where, at the end of each cycle, they are completely discharged. In this way, the use of a battery bank operating as an energy lung, i.e. supplying the electric motor with electric power and being recharged by the power generated by the generator that is driven by the combustion engine every time the battery charge is reduced, allows, in addition to a greater autonomy to the vehicle, also that the mentioned hybrid system of the present invention, is, by means of a resizing of the dimensional design, be used in any type of vehicle, whether light or heavy vehicles; in this last case, it would be, for instance, a collective vehicle moved by diesel.

In addition, as the power "peaks" are supplied by the battery bank, the engine power, such as a diesel engine, (and the accompanying alternator) can be reduced in a remarkable way. In a traditional vehicle, the internal combustion engine needs to be dimensioned to supply the "peak" power (maximum power) required by the work conditions, even if, most of the times, it operates with very lower power.

In the hybrid traction system described herein, the combustion engine, like the diesel engine, needs only to be dimensioned to supply the work average power, as the "peaks" are supplied by batteries, and during the "valleys", the exceeding power is used for battery recharging. The engine power reduction of the diesel engine becomes an additional factor to the reduction of the fuel consumption and of pollutant emission.

For the same reasons, it is quite less the noise indices from engine, what also causes the decrease of the sound pollution.

Therefore, it is one of the main objectives of the present invention to provide the hybrid vehicle which needs lower fuel consumption, lower air pollutant emission, mainly when it is under urban utilization condition, and less noise level, so contributing to the decrease of sound pollution.

The conventional vehicle with internal combustion have an unique battery and exclusively for their ignition and lighting system, being this battery small and of little use. In the electric vehicles only moved by battery, it is necessary to use a great amount of batteries to get the power required by the traction motor. These batteries, in addition to provide limited autonomy to the vehicle, due to the low capacity of accumulate charge that they have, need frequent recharges, and the higher the vehicle use, the greater the need of recharge frequency. In the hybrid vehicles, with traction solely by means of electric motors, as in the U.S. Pat. No. 5,428,274—issued on Jun. 27, 1995, the electric motor is fed by batteries that are charged by means of the generator, being discharged to supply charge to the engine. In this case, the battery acts constantly, which will require frequent conditions of elevated charge for this type of battery, as described in this patent. If the battery was used to supplement the electricity within the region between 60% of maximum power and 100% of the maximum power, battery would need a higher capacity, becoming bigger and heavier. Instead of this, when the power requirement is between 60 up to 100% of maximum power, this patent of the State of the Art uses as solution the utilization of internal combustion engine, to supply the battery incapacity to act within this power range.

Such a solution has as disadvantages the fact that the battery needs constant charge in the power range of up to 60% of the maximum power and the use of a internal combustion engine with equivalent power to the maximum power of the electric motor.

In this case, the engine is the one acting as an "Energy Lung". To reach, as indicated in the patent of the state of the art, lower dimensions and weights for the battery system, the previously proposed solution evidently would require an internal combustion engine dimensioned to the power equivalent to the electric motor maximum power, what results in a engine with higher dimensions and weights than if only batteries were used as power suppliers, what is indicated as undesirable in the reference, due to the high weights and dimensions that such a system would cause. Another drawback of this solution is the higher economic value to use of the engine.

Aiming at solving these drawbacks of the State of the Art on this application, a solution is proposed where a "battery bank" is used that works as an "energy lung", that operates supplying power on occasions of maximum power and accumulating power during situations of low power, differently from the mention where the engine works with such an objective. Obviously, the combustion engine and the generator driven by said engine, do not need to be dimensioned for extreme demand conditions.

Consequently, the engine power, weight and size of internal combustion engine and the generator, required to operate the vehicle, will be significantly reduced. This will make also possible the use of the system proposed in the present application in light vehicles. This is due to the fact that on every vehicle, the power used depends, at any moment, of the vehicle operating conditions, reaching high values—maximum power—during accelerations and climbing slopes, and reduced values during decelerations or down slopes. Between these two extreme situations, the average power is consumed.

One of the main objectives of the present invention, therefore, is to provide one device of power supply and accumulation such as a battery, and, more specifically, an "energy lung" of small batteries, with much lower capacity than the ones that would be required to operate a vehicle only moved by batteries, and that acts in supplying energy at maximum power occasions and accumulating energy during situations of low or no power. In given situations, power "peaks" can reach from two to three times the required average power, and the "valleys" can arrive to zero. The exact values depend again on the roadway, traffic conditions and driver's driving style. The simple reduction in the engine dimensioning, for instance, fueled by diesel, and in the dimensioning of the generator, that, instead of being dimensioned to supply the "peak" powers they need only to supply the average power, what implies in consumption and pollution, reductions as already indicated.

Other objective and additional advantages of the applicability of the present invention will be shown in the detailed description below, taken in conjunction with the attached drawing.

DESCRIPTION OF THE PREFERRED EMBODIMENTS

Figure 1:
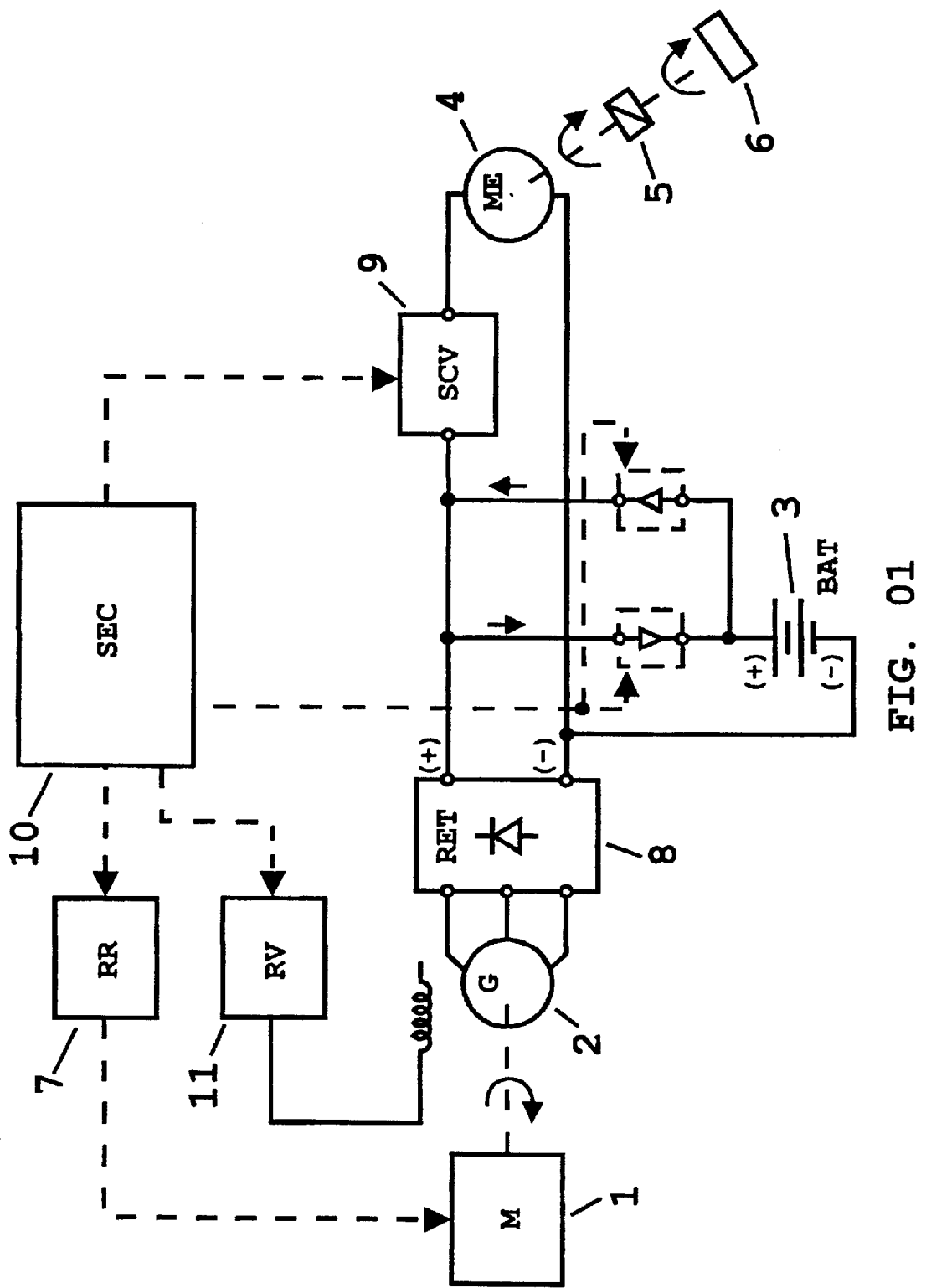
FIG. 1 shows in a schematic way the operation system of a hybrid vehicle, as well as its devices for power supply and accumulation.

In FIG. 1, we present in a simplified way the functional components shown in schematic form in order to ease the understanding of the work and control components interrelated with the functioning of the global system.

The hybrid traction system described herein has on board an electric power double source, namely:

An engine-generator including an internal combustion engine (1) that drives a generator (2) (usually an alternator), also identified on FIG. 1 as M (internal combustion engine) and G (generator/alternator); and A battery set or energy lung (3), as seen on figure one, hereinafter identified as BAT.

The engine-generator set function is to provide electric power to the electric motor (4) identified on FIG. 1 and hereinafter as ME.

This electric motor (4) is the only engine to drive the vehicle, and under no instance does the internal combustion engine (1) participate in the function of driving the vehicle wheels. As one can see on the FIGURE, the electric motor (4) ME, is connected to a speed reducer (5) which, in turn, is directly connected to driven wheels (6) of the hybrid vehicle.

In other words, the vehicle driving is always made by the electric motor (4) and in no instance does the internal combustion engine (1) directly participate in the shaft drive.

The energy lung function (3) or battery bank BAT is to accumulate electric power, to be used only in the moments of high energy demand, as, for instance, during quick accelerations or ascending slopes.

The internal combustion engine (1) is always kept in rotation or constant angular speed during all operating ranges of the hybrid vehicle, by means of the rotation regulator (7), hereinafter identified as RR, in accordance with diagram on FIG. 1. This regulator (7) makes possible the internal combustion engine (1) to work always at a constant rotation, regardless the power requested by alternator/generator G. This characteristic of constant rotation provides significant improvements on the pollutant emission and fuel consumption, as the internal combustion engine can be optimized to this operating range, and is not submitted to accelerations and decelerations usually required in the traffic operations.

In a generic way, the functioning of the system is processed on the following manner:—the internal combustion engine (1) M provides the required power, at a constant rotation, to the alternate current generator (2). The power in the form of alternate current generated by the generator (2) is rectified by means of rectifier (8), also identified in the FIGURE as RET and turned into direct current. By its turn, this demand of direct electric current is required by the driving electric motor (4) ME by the demand of the speed control (9) hereinafter identified as SCV, which is operated by the driver of the hybrid vehicle, depending on the acceleration, deceleration, ascensions and passing, in short, on traffic conditions and driving conditions of the vehicle. In situations such as slope ascension or passing, where the power required by the electric motor (4) is higher than the electric power capacity of the generator group, as called the assembly internal combustion engine (1) and generator (2), comes into action, as a complement of the latter, the battery bank (3), all of this system managed by a control electronic system (10), hereinafter identified as "SEC".

In a more specific manner, the electronic system SEC may be explained as follows:

The electric motor (4) requires that a given electric power be delivered, in order to perform the function that is required from it by the driver of the hybrid vehicle at every moment (accelerate or brake). In this way, when the driver positions the accelerator pedal, which is directly connected to the speed control (9), until a given position (for instance, 30% of its total course), in reality is requesting a given acceleration of the vehicle (30% of the maximum design speed, in the example given). So, the electronic control system (10) receives the information about the accelerator, and responds to the driver control by acting on the armature chopper and controlling the chopper to increase the armature current of the driving electric motor (4). At the same time, as the electric motor (4) increase its speed, the electronic control system (10) acts on the motor (4), allowing the electric motor armature voltage increase. Therefore, increase of power is transmitted to the drive motor up to achievement of the desired acceleration. The braking is started when the driver presses the brake pedal.

During braking, the inverse sequence occurs. The acceleration during braking becomes negative, the accelerator pedal is in its rest position and the electric motor (4) starts to generate power, instead of absorbing it.

The absorbed electric power, as well as the power generated, are calculated by means of a power electronic sensor (not shown on diagram), an electric motor armature current sensor within (4), and from an electric motor field current sensor within (4).

A closed loop system, resident in the electronic control system (10) is responsible for controlling the absorbed or generated power, by means of two choppers, IGBT (that are integral part of SCV (9)), one of them acting on the electric motor armature (4) and the other one acting on the electric motor field (4), making the electric power supplied to it to be that necessary to cause the acceleration required by driver when he first pressed the accelerator up to a given position or that the electric power generated, in case of deceleration and/or braking, is sent to battery bank (3) for recharge. All these sensors allow calculation of the instantaneous power and of the driving electric motor speed.

The control electronic system (10) acting to control the voltages and currents that go through the several components of the system, works with six (6) regulators, with closed loop circuit, acting simultaneously and in a coordinated way, namely:—an electric motor armature current regulator, an electric motor field current regulator, and an electric motor armature voltage regulator jointly control the torque and the speed, and therefore, the power absorbed or generated by the electric motor (4). A voltage regulator (11) of the generator (2) is responsible for the control of voltage generated by generator (2), which is maintained constant regardless of the charge supplied by the generator. A maximum current regulator of the generator acts to limit the maximum current supplied by generator (2) and its function is to protect the generator, avoiding the generator from supply currents above its maximum design value, and, at the end, a maximum charge current regulator of the battery bank has the function of limiting battery charge regimen, avoiding the batteries to be damaged by excessive charge currents. This regulator acts on the generator (2) and reduces the output voltage whenever the charge current approaches a dangerous value.

Regarding the rectifier (8) output voltage regulator, which function is to maintain constant voltage for feeding the electric motor (4), regardless of it's the electric motor load, it must be noted that this control is made by means of a voltage regulator by closed loop circuit (11)—RV, that acts in a generator field (2) and that uses a generator armature voltage detector as a feedback signal. The generator field current is, then, controlled by means of an IGBT that responds to the controls of the voltage regulator (RV 11), always trying to keep armature voltage constant, regardless of the load fluctuations (demand of the electric motor "ME"). The generator (2) voltage is only reduced if excessive currents of battery charges are verified. This function is performed by the maximum current regulator of the battery bank (3) as mentioned above.

As a final remark, it must be emphasized that the battery is recharged whenever there is a "surplus" of the power generated by the alternator (or by the driving motor), in the moments where the power demand for driving is small, i.e., in descending slopes or during braking.

In addition to the previous explanations, it is clear that the proposed hybrid vehicle autonomy will not depend on the (small) power accumulated in the battery bank, but only on the fuel quantity available on the tank and on the consumption of the chosen combustion engine.

In turn, the consumption will depend on the necessary electric motor power and on the characteristics of the course, similarly to a conventional vehicle, for instance, a diesel moved vehicle.

What is claimed is:

1. A hybrid vehicle controlling and operating system including an internal combustion engine (1) operable at a constant rotation; a generator (2) driven by the internal combustion engine and providing a constant output voltage; a direct current electric motor (4) receiving power from said generator and providing the sole and exclusive drive source for the hybrid vehicle; a rechargeable battery source (3) connectable with the electric motor such that the battery source output voltage is provided as the input voltage to the electric motor only when the generator power supplied to the electric motor is insufficient to meet the power requirements of the electric motor, said battery source maintained charged by surplus charge from the generator and charge generated by the electric motor; an electrical control system means for controlling the electric power supply to said electric motor including means for supplying power to the electric motor only from the generator until the maximum power of the generator is insufficient to supply the power requirements of the electric motor, and for supplying additional power from the battery source only when the maximum power of the generator is insufficient to supply the power requirements of the electric motor, said electrical control system means further includes means for maintaining and controlling the charge and discharge of said battery source including evaluating the charge condition of the battery source, the surplus charge generated by the generator and the electric motor.

2. The hybrid vehicle controlling and operating system of claim 1 wherein said electrical control system means further comprises means for maintaining the internal combustion engine operating at a constant rotation over all load conditions.

3. The hybrid vehicle controlling and operating system as claimed in claim 1, further comprising a speed control mechanism responsive to an accelerator pedal position, and wherein said electrical control system controls the current supplied to the electric motor in response to said speed control mechanism.

4. A hybrid vehicle controlling and operating system including an internal combustion engine (1) operable at a constant rotation; a generator (2) driven by the internal combustion engine and providing a constant output voltage; a direct current electric motor (4) receiving power from said generator and providing the sole and exclusive drive source for the hybrid vehicle; a rechargeable battery source (3) connectable with the electric motor such that the battery source output voltage is provided as the input voltage to the electric motor only when the generator power supplied to the electric motor is insufficient to meet the power requirements of the electric motor, said battery source maintained charged by surplus charge from the generator and charge generated by the electric motor; an electrical control system means for controlling the electric power supply to said electric motor including means for supplying power to the electric motor only from the generator until the maximum power of the generator is insufficient to supply the power requirements of the electric motor, and for supplying additional power from the battery source only when the maximum power of the generator is insufficient to supply the power requirements of the electric motor, wherein said electrical control system means further comprises means for sensing and controlling the direct current electric motor armature current and motor voltage and the motor field current for controlling the torque and speed of the electric motor;

means for sensing and controlling the generator voltage and current to maintain a constant generator voltage and variable current output as a function of the electric motor load requirements; and means for controlling and managing the charging and discharging of the battery source.

5. The hybrid vehicle controlling and operating system as claimed in claim 4, wherein said constant rotation of the internal combustion engine is substantially at the engine maximum torque.

6. The hybrid vehicle controlling and operating system as claimed in claim 4, wherein the internal combustion engine works in one-to-one power relationship with the generator for constant supply of the electric motor.

7. The hybrid vehicle controlling and operating system as claimed in claim 4 further comprising means for supplying any surplus of energy generated by the generator and not used by the electric motor to the battery source for constant maintenance of the maximum charge thereon.

8. The hybrid vehicle controlling and operating system as claimed in claim 4, wherein the electrical control system means controls a constant rotation of the internal combustion engine through the actuation of a rotation regulator (7).

9. The hybrid vehicle controlling and operating system as claimed in claim 4, wherein the electrical control system means includes means for controlling the field current of the generator through actuation of a voltage regulator, based on the maintaining of voltage and current conditions at the electric motor.

\* \* \* \* \*